(12) United States Patent
Mortenson et al.

(10) Patent No.: US 6,999,204 B2
(45) Date of Patent: Feb. 14, 2006

(54) DOCUMENT PROCESSING USING COLOR MARKING

(75) Inventors: Tim Mortenson, Penfield, NY (US); Alexander Shustorovich, Pittsford, NY (US); Christopher William Thrasher, Rochester, NY (US)

(73) Assignee: Global 360, Inc., Dallas, TX (US)

( * ) Notice: Subject to any disclaimer, the term of this patent is extended or adjusted under 35 U.S.C. 154(b) by 797 days.

(21) Appl. No.: 09/826,728

(22) Filed: Apr. 5, 2001

(65) Prior Publication Data

US 2002/0145746 A1 Oct. 10, 2002

(51) Int. Cl.
G06K 9/00 (2006.01)
H04N 1/46 (2006.01)

(52) U.S. Cl. .................... 358/3.23; 358/3.31; 358/504; 358/505; 382/312

(58) Field of Classification Search ................. 358/1.9, 358/2.1, 3.03, 3.23, 3.27, 3.31, 501, 505, 358/517, 530, 504; 382/312, 162, 167
See application file for complete search history.

(56) References Cited

U.S. PATENT DOCUMENTS

| | | | |
|---|---|---|---|
| 3,938,088 A | 2/1976 | Clark | 340/146.3 B |
| 4,479,242 A | 10/1984 | Kurata | 382/17 |
| 4,538,182 A | 8/1985 | Saito | 358/280 |
| 4,553,261 A | 11/1985 | Froessl | 382/57 |
| 4,574,393 A | 3/1986 | Blackwell | 382/17 |
| 4,577,235 A | 3/1986 | Kannapell | 358/280 |
| 4,601,057 A | 7/1986 | Tsuji | 382/51 |
| 4,724,309 A | 2/1988 | Greene | 235/468 |
| 4,760,606 A | 7/1988 | Lesnick | 382/48 |
| 4,812,904 A | 3/1989 | Maring | 358/107 |
| 4,929,978 A * | 5/1990 | Kanamori et al. | 355/38 |
| 4,985,863 A | 1/1991 | Fujisawa | 364/900 |
| 5,010,580 A | 4/1991 | Vincent | 382/17 |
| 5,014,328 A | 5/1991 | Rudak | 382/17 |
| 5,016,096 A | 5/1991 | Matsunawa | 358/75 |
| 5,048,099 A | 9/1991 | Lee | 382/22 |
| 5,048,109 A | 9/1991 | Bloomberg | 382/52 |
| 5,138,465 A | 8/1992 | Ng | 358/153 |
| 5,157,740 A | 10/1992 | Klein | 382/51 |
| 5,280,367 A | 1/1994 | Zuniga | 358/462 |
| 5,410,617 A | 4/1995 | Kidd | 382/51 |
| 5,552,894 A * | 9/1996 | Aiba | 382/299 |
| 5,579,407 A | 11/1996 | Murez | 382/164 |
| 5,621,816 A | 4/1997 | Ruppert | 382/63 |
| 5,754,697 A | 5/1998 | Fu | 382/232 |
| 5,761,338 A | 6/1998 | Kasamatsu | 382/176 |
| 5,848,413 A | 12/1998 | Wolff | 707/10 |
| 5,873,077 A | 2/1999 | Kanoh | 707/3 |
| 6,009,195 A | 12/1999 | Nakata | 382/175 |
| 6,028,956 A | 2/2000 | Shustorovich | 382/156 |

(Continued)

Primary Examiner—Jerome Grant, II
(74) Attorney, Agent, or Firm—Gardere Wynne Sewell LLP (57) ABSTRACT

The present invention provides an apparatus, method and computer program for processing documents using color marking. The apparatus includes a color scanner, a memory and a processor. The color scanner creates an image of each document. The memory stores one or more document processing instructions associated with the presence or absence of one or more color swatches within the image. The processor is coupled to the color scanner and the memory. In addition, the processor controls the color scanner, determining whether one or more color swatches are present or absent in the image and executing the document processing instructions associated with the presence or absence of the one or more color swatches.

36 Claims, 5 Drawing Sheets

U.S. PATENT DOCUMENTS

| | | | |
|---|---|---|---|
| 6,035,059 A | 3/2000 | Kurosawa | 382/164 |
| 6,674,893 B1 * | 1/2004 | Abe et al. | 382/154 |
| 2001/0015815 A1 * | 8/2001 | Hada et al. | 358/1.9 |
| 2002/0047848 A1 * | 4/2002 | Odagiri et al. | 345/581 |

* cited by examiner

DOCUMENT PROCESSING USING COLOR MARKING

FIELD OF THE INVENTION

The present invention relates in general to document processing technology, and more particularly, to document processing using color marking.

BACKGROUND OF THE INVENTION

For many years, most image capture systems needed a sheet with a "patch code" inserted before each new document in order to indicate the beginning of a new document when scanning batches of documents containing varying numbers of pages. Patch codes are not bar codes. Patch codes are the special, large, black stripes that are sometimes pre-printed on forms, such as health claim forms. There is a standard for patch codes, which is readily available from, for example, the Internet. There are three (3) varieties of patch codes, but in every case a patch is a pattern of parallel, alternating bars and spaces that is printed on a page. Scanners and scanning software can detect these patch codes and trigger the scanning process to recognize that this is the first page of a new document or to separate batches of related documents from each other. The downside is that the patch code must be either pre-printed on the document, taking up valuable space, or, more commonly, pre-printed on a separate sheet of paper, which is inserted manually between each document or batch of documents prior to scanning and then manually removed after scanning. In addition, the marking must often be located in the same location on each document. If there is a variance in the location of the marking, entire batches of documents may be unreadable.

More recently, image capture software has been developed that allows the use of pre-printed bar codes to indicate the lead page of a new document within a batch. The bar codes may also indicate additional pages in documents that do not contain varying numbers of pages.

Accordingly, there is a need for document processing which is not dependent on patch or bar codes, does not require pre-printing, does not need manual insertion and removal of extra pages and does not constrain the application of markings.

SUMMARY OF THE INVENTION

The present invention relates to document processing technology and provides the ability to designate a document process based on color marking. This type of document processing can be used in such fields as the processing of health claim or insurance forms. The present invention can be used by anyone who processes documents, particularly in large numbers.

The present invention provides document processing which is not dependent on patch or bar codes, does not require pre-printing, does not need manual insertion and removal of extra pages and does not constrain the application of markings. The present invention detects color swatches on documents and, based on the color applied, designates the processing for the documents. Additionally, the present invention provides the ability to remove markings from the document images and save the document images in their pre-marked form. Because the present invention does not need specially colored forms or extra pages and does not constrain the application of markings, it can result in cost savings in such areas as inventories, training and computer equipment.

The present invention provides an apparatus having a color scanner, a memory and a processor. The color scanner creates an image of each document. The memory stores one or more document processing instructions associated with the presence or absence of one or more color swatches within the image. The processor is coupled to the color scanner and the memory. In addition, the processor controls the color scanner, determining whether one or more color swatches are present or absent in the image and executing the document processing instructions associated with the presence or absence of the one or more color swatches.

In addition, the present invention provides a method for processing one or more documents by creating an image of each document, determining whether one or more color swatches are present or absent in the image, and executing one or more document processing instructions associated with the presence or absence of the one or more color swatches.

Furthermore, the present invention provides a computer program embodied on a computer-readable medium comprising a code segment for creating an image of each document, a code segment for determining whether one or more color swatches are present or absent in the image, and a code segment for executing one or more document processing instructions associated with the presence or absence of the one or more color swatches.

Other features and advantages of the present invention will be apparent to those of ordinary skill in the art upon reference to the following detailed description taken in conjunction with the accompanying drawings.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts in which.

DETAILED DESCRIPTION

The present invention relates to document processing technology and provides the ability to designate a document process based on color marking. It should be understood that the principles and applications disclosed herein can be applied to a wide range of processing scenarios, such as the processing of health claim or insurance forms. For purposes of explanation and illustration, the present invention is hereafter described in reference to the processing of documents. The present invention can be used for document separation, identification and/or action. As a result, the present invention is useful to anyone who processes documents, particularly in large numbers.

The present invention provides document processing which is not dependent on patch or bar codes, does not require pre-printing, does not need manual insertion and removal of extra pages and does not constrain the application of markings. The present invention detects color swatches on documents and, based on the color applied, executes the appropriate document processing instructions. Additionally, the present invention provides the ability to remove markings from the document images and save the document images in their pre-marked form. Because the present invention does not need specially colored forms or extra pages and does not constrain the application of markings, it can be used to save time, improve customer service, increase employee satisfaction, and achieve greater accuracy in the capture of document information.

The user of the present invention may choose the color marking or color swatch and indicate that its presence or absence anywhere on the page or within a zone should trigger the execution of one or more document processing instructions. Moreover, multiple color swatches or patterns of swatches can be used to automatically control the processing of a document. For example, the use of six colors, such as yellow, green, blue, pink, purple or orange, etc., can provide 64 binary combinations formed by the presence or absence of the colors. The document processing instructions may indicate the first page of a multi-page document, the next page of a current one, how and where the document should be stored or where the document should be routed.

For example, the color swatch can indicate the first page of a multi-page document. This is convenient if most of these documents have at least a couple of pages. Another possibility is to reverse the logic and mark attachments instead. This will save time if most documents are single-page and attachments are present only infrequently. Another possible use is for routing. For example, a yellow swatch in the upper left corner of a lead page of a document (marked as described above) may mean that the document should be sent to Accounting. A yellow swatch in the upper right corner of a lead page of a document may mean that it should be forwarded to Personnel. A pink swatch in that same upper left corner may mean that the document should go to Customer Service, etc. Thus, these combinations of binary flags can be used to convey rather complicated messages. Moreover, the present invention can detect and classify color swatches regardless of how the mark was applied. The color swatches can be pre-printed, manually applied with a highlighter or marker, or mechanically applied.

Figure 1:
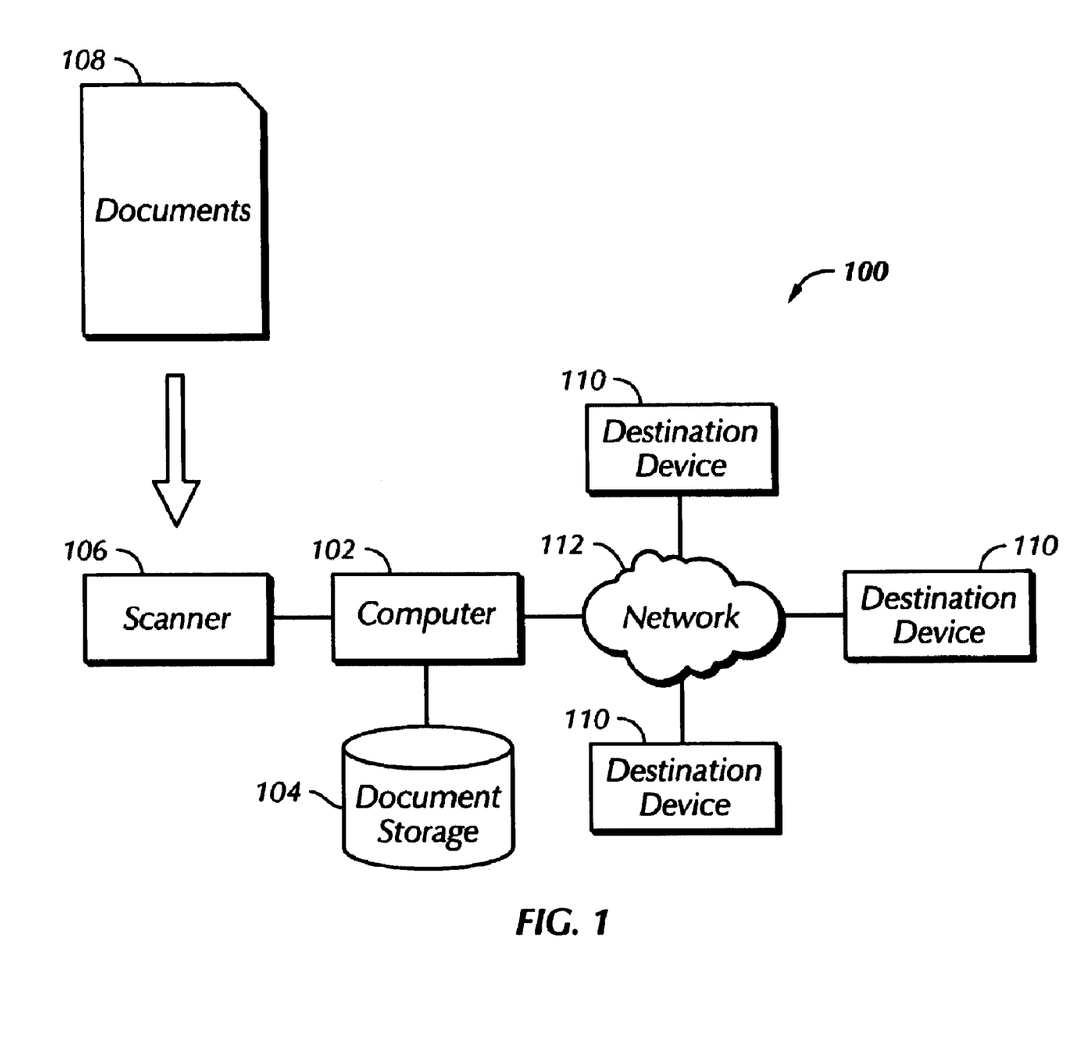
FIG. 1 is a block diagram of a system in accordance with one embodiment of the present invention.

Now referring to FIG. 1, a block diagram of a system 100 in accordance with one embodiment of the present invention is shown. A computer 102 is communicably connected to document storage 104 and a scanner 106. The computer 102 preferably has the following minimum specifications: 500 MHz Pentium III (with MMX) or equivalent; 64 MB (128 MB Preferred) of memory; 17" diagonally measured (19"–21" Preferred) color monitor; and Microsoft® Windows® NT or 98 operating system. Document storage 104 can be part of the computer 102, a peripheral connected to the computer 102 or a remote storage device communicably connected to the computer 102 via a network. Document storage 104 can be one or more hard disk drives, removable disk drives, magnetic tape storage devices, memory or any other type of electronic storage device. Scanner 106 can be part of a larger computerized device, a peripheral connected to the computer 102 or a remote device communicably connected to the computer 102 via a network.

Note that the present invention may be embodied as a plug-in module for imaging software, such as Kodak Mid-Volume Capture Software (MVCS), Version 3.3.0, resident on computer 102. Simple install procedures and configuration screens, incorporated in MVCS, allow quick installation of the present invention without programming. The imaging software controls the scanner 106, such as a Kodak Digital Science™ Color Scanner 3590C or 4500, and passes the images to the present invention which determines whether there are color swatches in pre-defined regions of interest and returns corresponding data to the imaging software.

Once documents 108 are fed into the scanner 106, the scanner 106 sends images of the documents 108 to computer 102 for processing. The imaging software and/or the present invention can process the document images in a real-time or batch mode. Both the pre-processing and post-processing document images can be stored in document storage 104. Post-processing document images may also be sent and stored to various destination devices 110 via network 112. Destination devices 110 can be other computers or storage devices. In addition, destination devices 110 can access and retrieve the document images in document storage 104 via computer 102 and network 112. The present invention can also automatically send post-processing document images to one or more specified destination devices 110 via network 112.

Figure 2A:
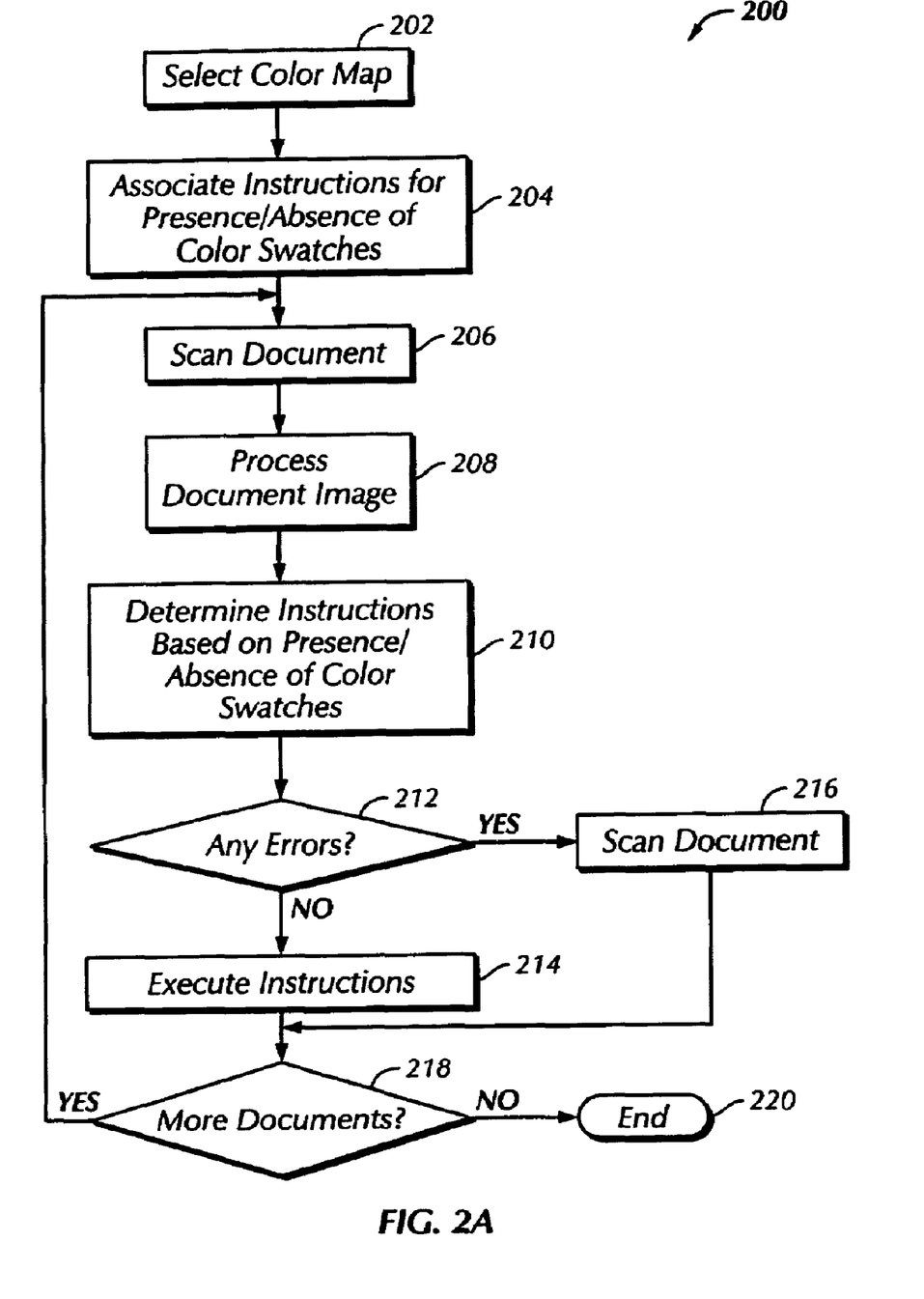
FIG. 2A is a flowchart depicting the operation of the present invention.

Referring now to FIG. 2A, a flowchart 200 depicting the operation of the present invention is shown. A color map is selected in block 202. The color map is one or more lookup tables identifying specific colors that are to be used as color swatches. The use of a color map speeds up the image processing of the present invention. In a preferred embodiment of the present invention there is no runtime analysis of relative numeric values of individual pixels; each of them is classified as "yellow", "green", "background", etc. individually and based only on its Red-Green-Blue (RGB) values. This is accomplished by using pre-computed color maps listing those RGB combinations we call "yellow", "green", "background", etc. The color map setup process will be described in more detail in relation to FIGS. 3, 4 and 5.

After the color map is selected in block 202, document processing instructions are associated with the presence or absence of color swatches in block 204. The color swatches indicate properties of the document that can be used to initiate an action using the document processing instructions. For example, a blue swatch on a document (machine printed or marked with a highlighter) can flag the system indicating a lead page. This eliminates the cumbersome and labor-intensive insertion and removal of patch sheets before and following scanning. The color swatches can also indicate what form or document type has just been scanned. Routing of a document image based on a color swatch can also be incorporated in workflow applications. Document separation, document identification, and document routing are just three of the labor saving uses for the present invention.

In addition, the different color swatches can be used to identify information fields having different meanings within the document and convert them to text. The coordinates of these fields can also be passed with system data to any output format (such as File Net, etc.), valid for the imaging software or accessible through application program interfaces (APIs). For example, using color swatches to identify fields for optical character recognition (OCR) can automate data entry on unstructured documents where the location of data varies, such as incoming invoices. This capability provides dramatic improvements in productivity by replacing manual indexing in applications unsuitable for traditional forms processing.

The document 108 (FIG. 1) is scanned and a document image is sent to the computer 102 (FIG. 1) for processing in block 206. The document images can be received or processed in a real-time or batch mode. The document image is then processed in block 208 for the presence or absence of color swatches. The document image processing will be described in more detail in reference to FIG. 2B. Document processing instructions are then determined based on the presence or absence of the color swatches in block 210. If there are not any errors, as determined in decision block 212, the document processing instructions are executed in block 214. If there are any errors, as determined in decision block 212, those errors are reported in block 216. If there are more documents, as determined in decision block 218, the process scans the next document in block 206 and repeats as described above. If, however, there are no more documents, as determined in decision block 220, the process ends in block 220.

Note that the process described above can be modified to process a batch of document images that have been previously stored. In such a case, block 206 would be unnecessary and decision block 218 would determine whether there were any more document images. In addition, the process described above can be performed before or after other document image processing. The present invention can also remove the color swatches from the document images either before execution or as part of the document processing instructions.

Figure 2B:
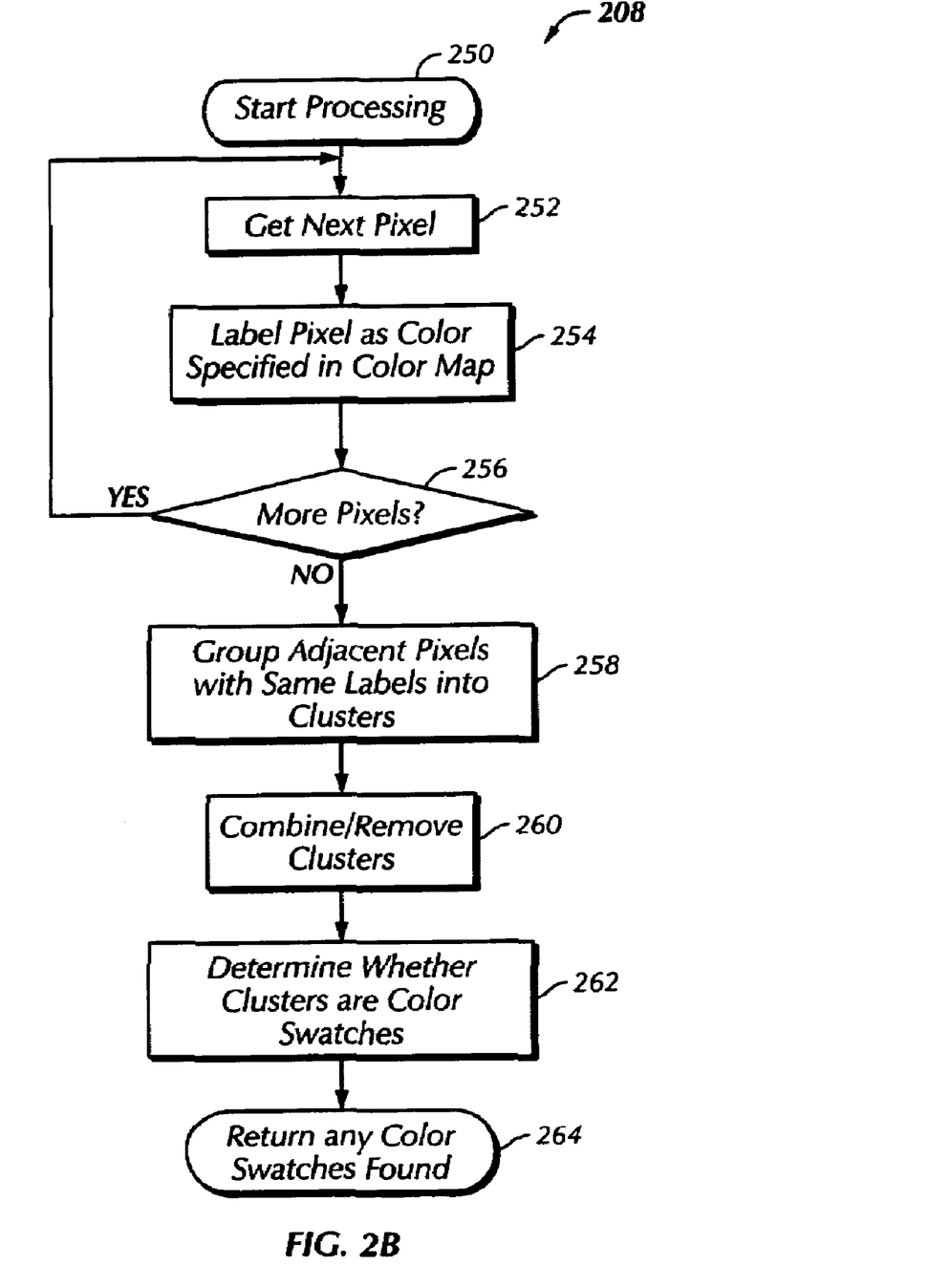
FIG. 2B is a flowchart depicting the processing of a document image in accordance with the present invention.

Now referring to FIG. 2B, a flowchart depicting the processing of a document image 208 in accordance with the present invention is shown. Processing starts in block 250 and the next pixel in the document image is obtained in block 252. The present invention can analyze every pixel within the document image or only analyze a region of interest where the presence or absence of a color swatch is expected. The RGB values of the pixel are used to label the pixel according to the color map in block 254. The pixel is labeled as unknown if the RGB value of the pixel is not otherwise found in the color map (unknown is a label in the color map). If there are any more pixels in the document image, as determined in decision block 256, the next pixel is obtained in block 252 and the process repeats as described above.

If there are no more pixels, as determined in decision block 256, adjacent pixels with the same label are grouped into clusters using a connected component analysis in block 258. The resulting clusters are then combined or removed based on their size and their proximity to other clusters with the same label in block 260. Next, the combined clusters are analyzed to determine whether they are color swatches based on their height, width, and density in block 262. Those combined clusters that pass the criterion are returned to the main process (FIG. 2A) as found color swatches in block 264.

Figure 3:
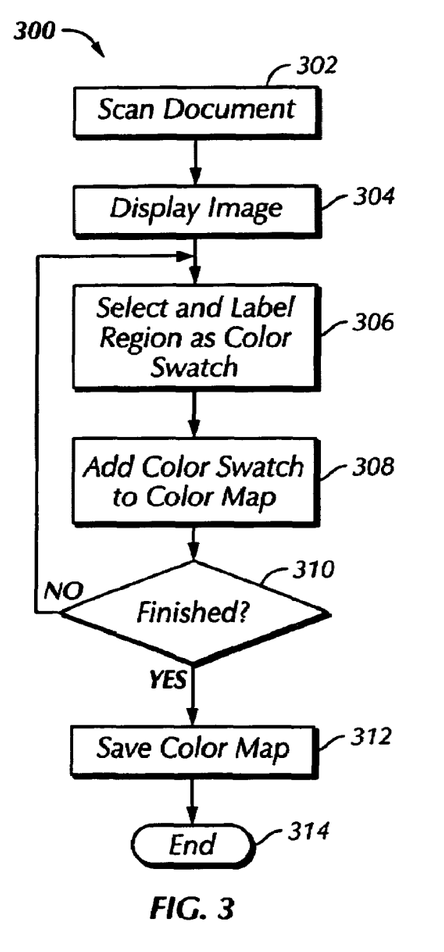
FIG. 3 is a flowchart depicting the creation of a color map in accordance with one embodiment of the present invention.

Referring now to FIG. 3, a flowchart 300 depicting the creation of a color map in accordance with one embodiment of the present invention is shown. A document is scanned in block 302 and the document image is displayed to the user in block 304. The user then selects and labels a region (rectangles or even individual pixels) of the document image as a color swatch in block 306. The RGB values of designated pixels (the color swatch) are then added to the lists forming the corresponding color map in block 308. The tool allows the user to continue this accumulation on different images. At any time during this process it is possible to see which pixels get labeled with what "color", this feedback allows the user to fine-tune the color map.

After all the desired color swatches on the document image have been selected and added to the color map, as determined in decision block 310, the lists are expanded, which allows all occupied RGB cells in the color cube to expand into unoccupied neighboring cells, up to a pre-defined distance, and the color map is saved in block 312. The setup process ends in block 314. If, however, not all the color swatches on the document image have been selected and added to the color map, as determined in decision block 310, the process returns to block 306 where another color swatch can be selected and labeled and the process continues as described above. This process 300 can be repeated numerous times on various documents in order to populate the color map with all of the color swatches that will be used. This setup process is convenient for processing of documents with pre-printed color swatches, like a company logo on its stationary.

Figure 4:
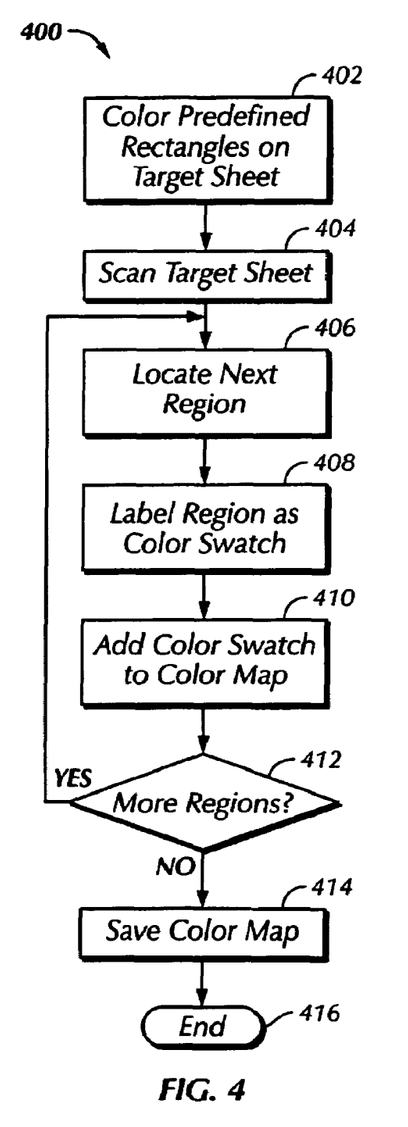
FIG. 4 is a flowchart depicting the creation of a color map in accordance with another embodiment of the present invention.

Now referring to FIG. 4, a flowchart 400 depicting the creation of a color map in accordance with another embodiment of the present invention is shown. The user colors pre-defined rectangles on a special target sheet, such as the one shown in FIG. 5, in block 402. The target sheet is then scanned on the same scanner on which the color map will be used in block 404. The rectangles of interest and "color" labels are derived from the structure of the target sheet. As a result, the system locates and selects the next rectangular region in block 406, and labels the region of the document image as a color swatch in block 408. The RGB values of designated pixels (the color swatch) are then added to the lists forming the corresponding color map in block 410.

After all the color swatches on the target sheet have been selected and added to the color map, as determined in decision block 412, the lists are expanded, which allows all occupied RGB cells in the color cube to expand into unoccupied neighboring cells, up to a predefined distance, and the color map is saved in block 414. The setup process ends in block 416. If, however, not all the color swatches on the document image have been selected and added to the color map, as determined in decision block 412, the process returns to block 408 where another color swatch is located and the process continues as described above. This process 400 can be repeated using numerous target sheets in order to populate the color map with all of the color swatches that will be used.

Figure 5:
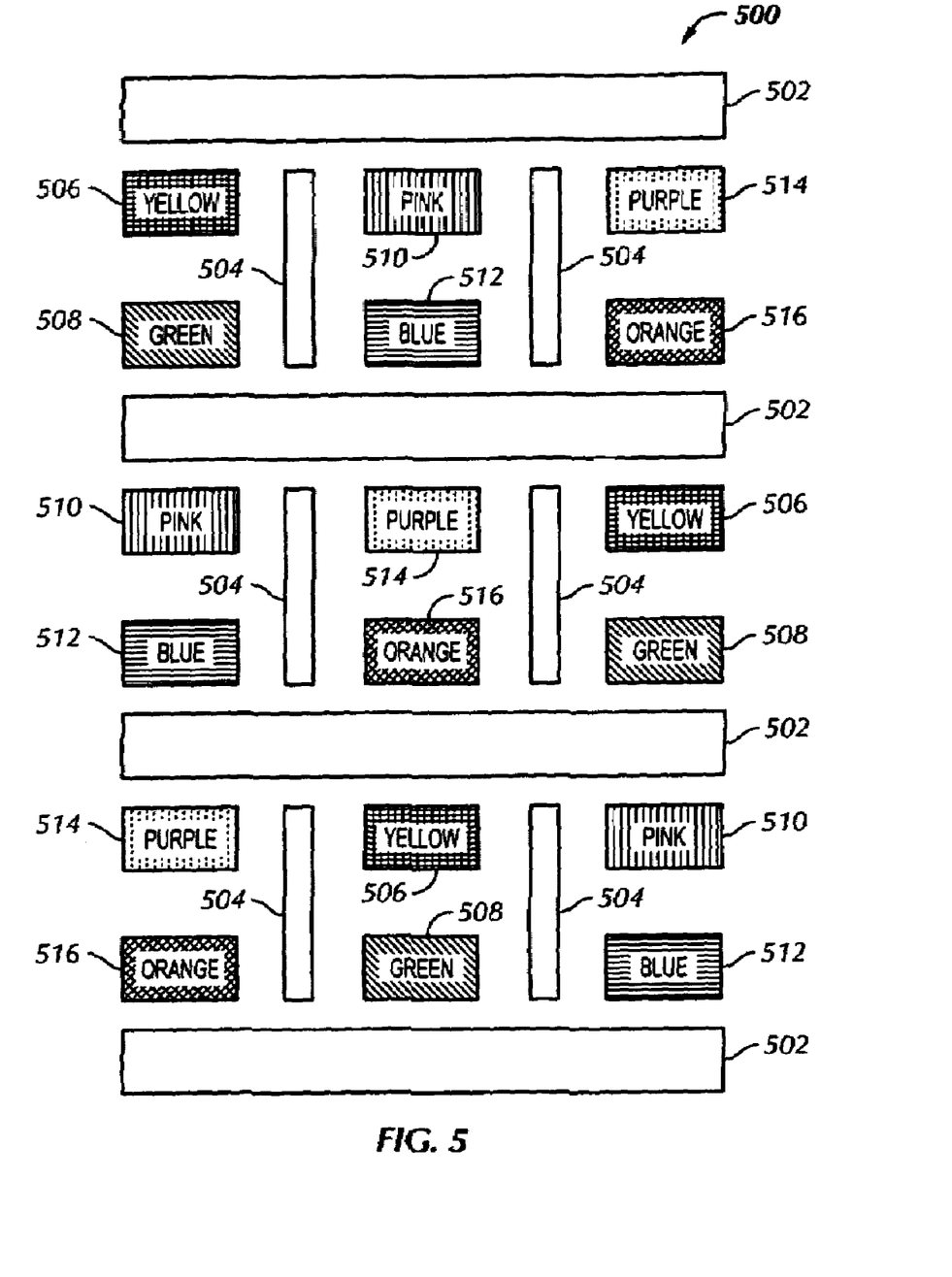
FIG. 5 is an exemplary target sheet in accordance with one embodiment of the present invention.

Referring now to FIG. 5, an exemplary target sheet 500 in accordance with one embodiment of the present invention is shown. The target sheet includes various uncolored blocks 502 and blackened blocks 504 to provide contrast and set the pixel value limits. Various colored blocks (Yellow 506, Green 508, Pink 510, Blue 512, Purple 514 and Orange 516) are then distributed around the target sheet 500 to allow for variations in the scanner and imaging process. Target sheets having other configurations may also be used.

The present invention is useful in any document processing scenario. Although preferred embodiments of the invention have been described in detail, it will be understood by those skilled in the art that various modifications can be made therein without departing from the spirit and scope of the invention as set forth in the appended claims.

What is claimed is:

1. An apparatus for processing one or more documents, comprising:

a color scanner configured to create an image of each document;

a memory configured to store one or more document processing instructions associated with the presence or absence of one or more color swatches within the image; and a processor coupled to the color scanner and the memory, the processor configured to control the color scanner, to determine whether one or more color swatches are present or absent in the image and to execute the document processing instructions associated with the presence or absence of the one or more color swatches, wherein one or more of the document processing instructions are used for document identification.

2. The apparatus as recited in claim 1 wherein the processor removes the one or more color swatches from the image.

3. The apparatus as recited in claim 1 further comprising a storage device configured to save the image.

4. The apparatus as recited in claim 1 wherein the document processing instructions indicate how the image will be stored.

5. The apparatus as recited in claim 1 wherein the document processing instructions indicate where the image will be stored.

6. The apparatus as recited in claim 1 wherein the document processing instructions indicate how the documents are to be sorted.

7. The apparatus as recited in claim 1 wherein the color swatch is pre-printed.

8. The apparatus as recited in claim 1, wherein one or more of the document processing instructions indicate a lead page of each document.

9. The apparatus as recited in claim 1, wherein one or more of the color swatches exist within the interior portion of the image.

10. The apparatus as recited in claim 1 further comprising:
   a document sorter coupled to the processor;
   a document feeder coupled to the color scanner, the processor and the document sorter; and
   the processor further configured to control the document sorter and document feeder.

11. The apparatus as recited in claim 10 wherein the color swatch is applied mechanically.

12. The apparatus as recited in claim 10 wherein the color swatch is applied manually.

13. A method for processing one or more documents, comprising:
   creating an image of each document;
   determining whether one or more color swatches are present or absent in the image; and
   executing one or more document processing instructions associated with the presence or absence of the one or more color swatches, wherein one or more of the document processing instructions are used for document identification.

14. The method as recited in claim 13 further comprising removing the one or more color swatches from the image.

15. The method as recited in claim 13 further comprising saving the image.

16. The method as recited in claim 13 wherein the document processing instructions indicate how the image will be stored.

17. The method as recited in claim 13 wherein the document processing instructions indicate where the image will be stored.

18. The method as recited in claim 13 further comprising sorting the document based on the document processing instructions.

19. The method as recited in claim 13 wherein the document processing instructions indicate how the documents are to be sorted.

20. The method as recited in claim 13 wherein the color swatch is pre-printed.

21. The method as recited in claim 13, wherein one or more of the document processing instructions indicate a lead page of each document.

22. The method as recited in claim 13, wherein one or more of the color swatches exist within the interior portion of the image.

23. The method as recited in claim 11 further comprising applying one or more color swatches to the document.

24. The method as recited in claim 23 wherein the color swatch is applied mechanically.

25. The method as recited in claim 23 wherein the color swatch is applied manually.

26. A computer program embodied on a computer-readable medium for processing one or more documents comprising:
   a code segment for creating an image of each document;
   a code segment for determining whether one or more color swatches are present or absent in the image; and
   a code segment for executing one or more document processing instructions associated with the presence or absence of the one or more color swatches, wherein one or more of the document processing instructions are used for document identification.

27. The computer program as recited in claim 26 further comprising a code segment for removing the one or more color swatches from the image.

28. The computer program as recited in claim 26 further comprising a code segment for saving the image.

29. The computer program as recited in claim 26 wherein the document processing instructions indicate how the image will be stored.

30. The computer program as recited in claim 26 wherein the document processing instructions indicate where the image will be stored.

31. The computer program as recited in claim 26 further comprising a code segment for sorting the document based on the document processing instructions.

32. The computer program as recited in claim 26 wherein the document processing instructions indicate how the documents are to be sorted.

33. The computer program as recited in claim 26 wherein the color swatch is pre-printed.

34. The computer program as recited in claim 26 further comprising a code segment for applying one or more color swatches to the document.

35. The computer program as recited in claim 26, wherein one or more of the document processing instructions indicate a lead page of each document.

36. The computer program as recited in claim 26, wherein one or more of the color swatches exist within the interior portion of the image.

* * * * *